(12) United States Patent
Chiba

(10) Patent No.: US 6,718,459 B1
(45) Date of Patent: Apr. 6, 2004

(54) DEVICE AND METHOD FOR ARITHMETIC PROCESSING

(75) Inventor: Satoshi Chiba, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 593 days.

(21) Appl. No.: 09/650,040

(22) Filed: Aug. 29, 2000

(30) Foreign Application Priority Data

Sep. 2, 1999 (JP) .......................................... 11-249327

(51) Int. Cl.$^7$ .......................... G06F 9/302; G06F 9/305
(52) U.S. Cl. ...................... 712/221; 712/223; 712/226; 712/229; 708/525
(58) Field of Search ................................. 708/524, 233, 708/490, 525; 712/222, 221, 23, 229, 223, 225, 226; 711/156; 710/55

(56) References Cited

U.S. PATENT DOCUMENTS

| 5,815,420 A | * | 9/1998 | Steiss | ........................ 708/524 |
| 6,016,543 A | * | 1/2000 | Suzuki et al. | ................ 712/233 |
| 6,079,008 A | * | 6/2000 | Clery, III | ....................... 712/11 |

* cited by examiner

Primary Examiner—Daniel H. Pan
(74) Attorney, Agent, or Firm—Scully, Scott, Murphy & Presser

(57) ABSTRACT

A numerical arithmetic circuit 50 executes an arithmetic instruction according to an instruction read out of a program memory 10 and then stores the arithmetic result into a register group 40 via an input switcher 70. A mode register 20 is associated with the register group 40. A flag designating whether or not a predetermined logic operation is executed to the arithmetic result is set to the mode register 20. When the register group 40 stores the arithmetic result, the mode register 20 corresponding to the register being the register group 40 designated on the program is referred as a register which stores the arithmetic result. Thus, a predetermined arithmetic and logic operation to the arithmetic result is controlled.

10 Claims, 7 Drawing Sheets

| | | |
|---|---|---|
| MODE REGISTER SETTING INSTRUCTION | →  | mode_reg = $0_x 802A$ |
| SATURATED MULTIPLICATION | → | R3 = R0 x R1 |
| UNSATURATED MULTIPLICATION | → | R2 = R3 x R4 |
| SATURATED ADDITION | → | R1 = R0 + R1 |
| UNSATURATED ADDITION | → | R0 = R3 + R4 |
| SATURATED ADDITION | → | R5 = R0 + R1 |
| UNSATURATED ADDITION | → | R4 = R2 + R3 | if( (mode_reg[REG] = = 1) resister = saturate

REGISTERED-　ENABLING FLAG
DESTINATION
INFORMATION

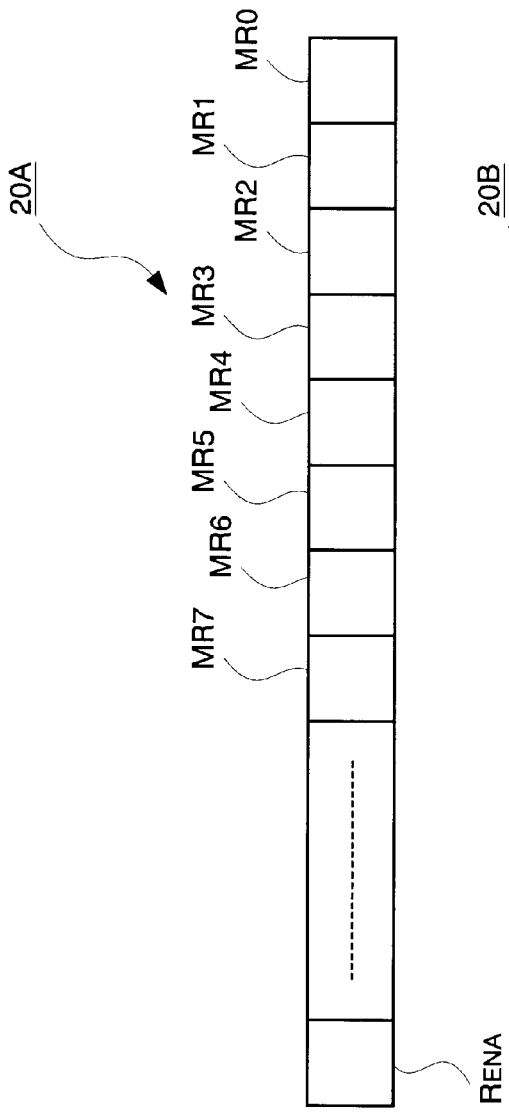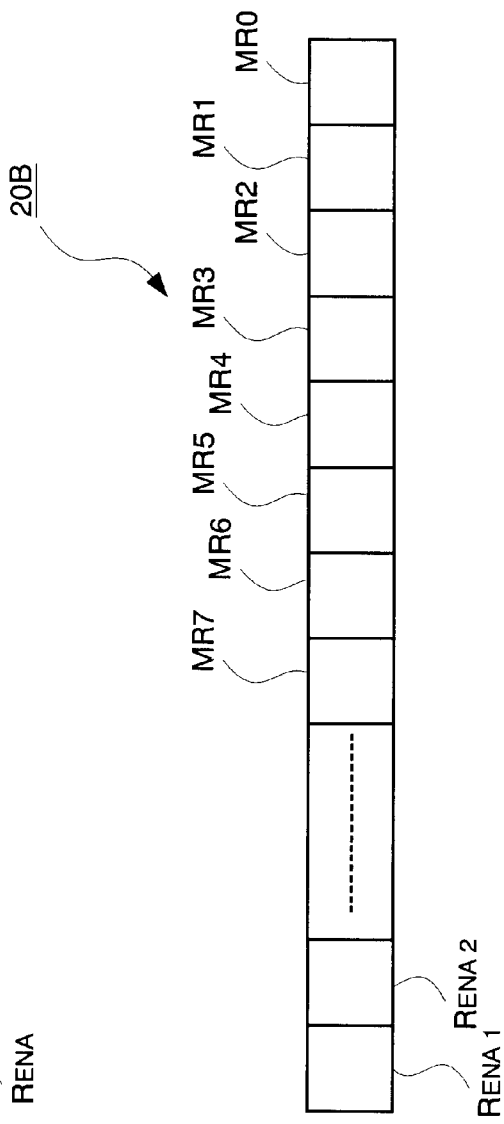
FIG. 7
FIG. 8

DEVICE AND METHOD FOR ARITHMETIC PROCESSING

BACKGROUND OF THE INVENTION

The present invention relates to a device and method for arithmetic processing that executes instructions according to, for example, a microprogram and then selectively performs a predetermined arithmetic and logic operation such as rounding or saturation, to instruction-execution results.

Conventionally, there are arithmetic processing devices for the purpose of numerical arithmetic operations. The arithmetic processing device is configured of a numerical arithmetic section for executing a numerical arithmetic operation according to a statement described with a program and a register group for temporarily storing an input value to the numerical arithmetic section or the arithmetic result. Numerical values are exchanged via the register group.

In that type of arithmetic processing devices, a long data length is set in the numerical arithmetic section to improve the arithmetic accuracy. For that reason, when the numerical arithmetic section stores an arithmetic result to the memory or outputs it to external circuits, a predetermined process is carried out to shorten the data length. The so-called rounding process of rounding the lower bits of an arithmetic result or the so-called saturation process of saturating to a value by discarding the upper bits when an arithmetic result exceeds a predetermined value is well known as the predetermined process.

For that reason, the above arithmetic processing device generally contains a processing section and the so-called mode register. The processing section performs a predetermined process such as rounding or saturation, when the register group stores an arithmetic result from the numerical arithmetic section. The so-called mode register sets a flag which designates whether or not a predetermined process such as rounding is performed to the arithmetic result of the numerical arithmetic section.

Whether or not the above special process is needed to carry out to an arithmetic result of the numerical arithmetic section is defined by a program describing a series of process procedures. If necessary, "1", for example, is written as a flag for the mode register. The flag to the mode register is rewritten every time the special process is performed.

In a program, for example, for a microprocessor, an instruction of executing a saturation process to an arithmetic execution result and an instruction of executing no saturation process may be alternately performed. In such a case, it is required to add the statement that resets a flag of the mode register for each instruction in each process on a program. The problem is that adding a statement leads to increasing the code size of the program and the number of execution steps so that the volume of the program is expanded.

SUMMARY OF THE INVENTION

The objective of the present invention is to solve the above-described tasks.

Furthermore, the objective of the invention is to provide an arithmetic processing device and method that can suppress an increase of the volume of a program describing a series of numerical arithmetic execution procedures even when a predetermined process is intermittently repeated to an instruction execution result.

In order to overcome the above mentioned problems, an arithmetic processing device of the present invention comprises a first register group (for example, a constituent element corresponding to the register group 40, to be described later) for storing an instruction execution result (for example, a factor corresponding to the arithmetic result A of the numerical arithmetic circuit 50, to be described later) executed according to a program which describes a series of procedures. A predetermined arithmetic and logic operation (for example, a constituent element corresponding to a specific process of the specific processing circuit 60, to be described later) is selectively performed to said instruction execution result when the first register group stores the instruction execution result. The arithmetic processing device further has a second register (for example, a constituent element corresponding to the mode register 20, to be described later) arranged corresponding to the first register group, for setting a flag specifying whether or not the arithmetic and logic operation is performed to an instruction execution result to be stored in a register including in the first register group specified on the program.

In the configuration of the arithmetic processing device, a flag designating whether to perform a predetermined arithmetic and logic operation to an instruction execution result is set to the second register. The bit of the second register corresponds to the first register. When a register in the first register group, to which an instruction execution result is stored, is designated on a program, whether to perform a predetermined process to the instruction execution result is determined according to the flag set to a bit of the second register corresponding to the designated register. In other words, if a flag is previously set to the second register, the presence or absence of a predetermined arithmetic and logic operation is determined by selecting a register, that is, a destination storing the instruction execution result. Therefore, it is unnecessary to vary a flag to designate whether to perform a predetermined arithmetic and logic operation on the program every operation. As a result, the statement on the program for setting a flag can be reduced.

Moreover, according to the present invention, an arithmetic processing device, wherein an instruction is executed according to a program which describes a series of procedures and a predetermined arithmetic and logic operation (for example, a constituent element corresponding to a specific process of the specific processing circuit 60, to be described later) is selectively performed to the instruction execution result (for example, a factor corresponding to an arithmetic result A of the numerical arithmetic circuit 50, to be described later), comprises a program storage section (for example, a constituent element corresponding to the program memory 10, to be described later) for storing said program; an instruction execution section (for example, a constituent element corresponding to the numerical arithmetic circuit 50, to be described later) for executing an instruction described in said program; a first register group (for example, a constituent element corresponding to the register group 40, to be described later) for storing an instruction execution result from said instruction execution section; an arithmetic processing section (for example, a constituent element corresponding to the specific processing circuit 60, to be described later) for performing a predetermined arithmetic and logic operation of said instruction execution result; a second register (for example, a constituent element corresponding to the mode register 20, to be described later) arranged corresponding to said first register, for designating whether or not said predetermined arithmetic and logic operation is performed, to said instruction execution result of said instruction execution result; and a control section (for example, a constituent element corresponding to the decoder 30, to be described later) for controlling said arithmetic and logic operation to said instruction execution result, by referring to a flag (for example, a constituent element corresponding to the flag set to the bits MR0 to MR7 of the mode register 20, to be described later) set to said second register corresponding to registers (for example, a constituent element corresponding to the registers MR0 to MR7, to be described later) forming said first register group designated on said program when said instruction execution result is stored in said first register group, said register acting as a register storing said instruction execution result.

According to the above configuration of the arithmetic processing device, when an instruction execution result is stored into the first register group, the control section controls a predetermined arithmetic and logic operation of the instruction execution result. When a register in the first register group, to which the instruction execution result is stored, is designated on the program, the control section refers to a flag set to the bit of the second register, being a bit corresponding to the designated register. Thus, the control section controls a predetermined process to the instruction execution result according to the flag. In other words, when a flag is previously stored in the second register, whether to perform a predetermined logic operation is controlled by selecting a register being a destination to which the instruction execution result is stored. Therefore, it is unnecessary that a flag to designate whether to perform a predetermined arithmetic and logic operation is varied on the program every operation cycle. As a result, the statement described on the program for setting a flag can be reduced.

The control section, for example, controls the arithmetic processing section to selectively execute the predetermined arithmetic and logic operation of the instruction execution result of the instruction execution section, according to the flag.

In the above configuration of the arithmetic processing device, since a predetermined arithmetic and logic operation is controlled according to a flag, the frequency of the operation of the arithmetic processing section can be suppressed at minimum.

The control section, for example, controls the arithmetic processing unit to uniformly execute the arithmetic and logic operation of an instruction execution result of the instruction execution section, selecting an instruction execution result (for example, a constituent element corresponding to the arithmetic result A of the numerical arithmetic circuit 50) of the instruction execution section or an arithmetic result of the arithmetic processing section (for example, a constituent element corresponding to the arithmetic result B of the specific processing circuit 60) according to the flag, and thus storing the selected result into the first register group.

In the above configuration of the arithmetic processing device, the arithmetic processing section uniformly performs independently of the content of a flag so that the result of instruction execution or predetermined arithmetic and logic operation is selected according to the flag. Hence, a flag can be referred to during a predetermined process so that the logic operation can be performed at high speed.

The second register, for example, has a plurality of bits corresponding to the first register group and a control bit (for example, a factor corresponding to the bit $R_{ENA}$) for setting a control flag determining whether or not flags set by the plurality of bits are validated.

In the above configuration of the arithmetic processing device, whether to perform a predetermined arithmetic and logic operation to an instruction execution result can be controlled according the flag set to the second register by rewriting the control flag only, without rewriting bits corresponding to the first register group, or the bit of the second register. Thus, errors that may occur in rewriting a flag can be prevented previously. Whether to perform a arithmetic and logic operation can be certainly controlled according to the flag set to the second register.

The second register, for example, has a plurality of bits corresponding to the first register group and a plurality of second control bits (for example, factors corresponding to the registers $R_{ENA1}$ and $R_{ENA2}$) for setting plural control flags corresponding to the content of the predetermined arithmetic and logic operation, the plural control bits determining whether or not flags set by the plurality of bits are validated.

In the above configuration of the arithmetic processing device, the control flag is selectively rewritten according to the content of a predetermined arithmetic and logic operation of the arithmetic processing section. Thus, whether the arithmetic processing section performs an arithmetic and logic operation to an instruction execution result of the instruction execution section can be controlled for each content of the arithmetic and logic operation, without rewriting bits corresponding to the first register or the bit of the second register. Accordingly, another process such as rounding can be controlled to the instruction execution result, in addition to the special process such as saturation process.

Moreover, according to the present invention, an arithmetic processing method, wherein an instruction is executed according to a program on which a series of procedures are described and a predetermined arithmetic and logic operation is selectively performed to the instruction execution result (for example, a factor corresponding to an arithmetic result of the numerical arithmetic circuit 50), thus storing the arithmetic result into the first register group, comprises (a) a first step (for example, a factor corresponding to the step S10) of setting a flag to a second register corresponding to a register included in the plural first register group designated on the program, the register acting as a register storing the instruction execution result; (b) a second step (for example, a factor corresponding to the step S11) of executing an instruction described on the program; (c) a third step (for example, a factor corresponding to the steps S12 to S13) of controlling the predetermined arithmetic and logic operation to the instruction execution result, by referring to a flag set to the second register when the first register group stores the instruction execution result; and (d) a fourth step (for example, a factor corresponding to the step 14) of storing an instruction execution result subjected to the predetermined arithmetic and logic operation into the first register group.

According to the above method, a flag designating whether to perform a predetermined arithmetic and logic operation to an instruction execution result is set to the second register. The bit of the second register corresponds to the first register group. When one of registers in the first register group, to which an instruction execution result is stored, is designated on a program, whether to perform a predetermined process to the instruction execution result is determined according to the flag set to the bit of the second register corresponding to the designated register. In other words, if a flag is previously set to the second register, the presence or absence of a predetermined arithmetic and logic operation is determined by selecting a register, that is, a destination storing the instruction execution result. Therefore, it is unnecessary that a flag for designating whether to perform a predetermined arithmetic and logic operation is varied on the program for each operation. As a result, the statement on the program for setting a flag can be reduced.

In the third step, the predetermined arithmetic and logic operation of the instruction execution result of the instruction execution result is selectively executed according to the flag.

In the above method, since a predetermined arithmetic and logic operation, for example, is controllably executed according to a flag, the execution frequency of the predetermined arithmetic processing can be suppressed at minimum.

In the third step, the selected result is stored into the first register group by uniformly executing the arithmetic and logic operation of an instruction execution result and by selecting the instruction execution result or an arithmetic result of the predetermined arithmetic processing, according to a flag set to the second register (for example, a factor corresponding to steps S22 to S25).

According to the above method, a predetermined arithmetic and logic operation is uniformly performed independently of the content of a,flag to select an instruction execution result or a predetermined arithmetic and logic operation according to the flag. Hence, a flag can be referred to during the predetermined process so that the logic operation can be performed at high speed.

In the first step, a flag is set to said second register bit being a bit corresponding to the first register group and a control bit is set to the control bit of the second register. The control bit determines whether or not the flag is validated. In the third step, a control bit set to the control bit of the second register is referred to in advance of a flag set to the bit of the second register, the bit of the second register being a bit corresponding to the first register group. The flag corresponding to said first register group is referred to when the content of the control flag is affirmative, so that the predetermined arithmetic and logic operation is controlled.

According to the above method, whether to validate the flag set to the bit of the second register group being the bit corresponding to the first register group is determined by the control flag. In other words, only when validating a flag to which the control flag is set to the second register is affirmative, a predetermined arithmetic and logic operation is performed to an instruction execution result by referring to the flag set to the second register corresponding to the first register group. When validating the flag to which the control flag is set to the second register is negative, the flag set to the second register corresponding to the first register group is ignored. Thus, the predetermined arithmetic and logic operation is not executed at all. Whether to perform a predetermined arithmetic and logic operation to an instruction execution result can be controlled without rewriting the flag set to the bit of the second register being the bit corresponding to the first register.

BRIEF DESCRIPTION OF THE DRAWINGS

This and other objects, features and advantages of the present invention will become more apparent upon a reading of the following detailed description and drawings, in which:

FIG. 7 is a diagram illustrating a mode register within an arithmetic processing device according to the third embodiment of the present invention and FIG. 8 is a diagram illustrating a mode register within an arithmetic processing device according to the fourth embodiment of the present invention.

DESCRIPTION OF THE EMBODIMENTS

Embodiments of the present invention will be described below with reference to the attached drawings.
(First Embodiment)

Figure 1:
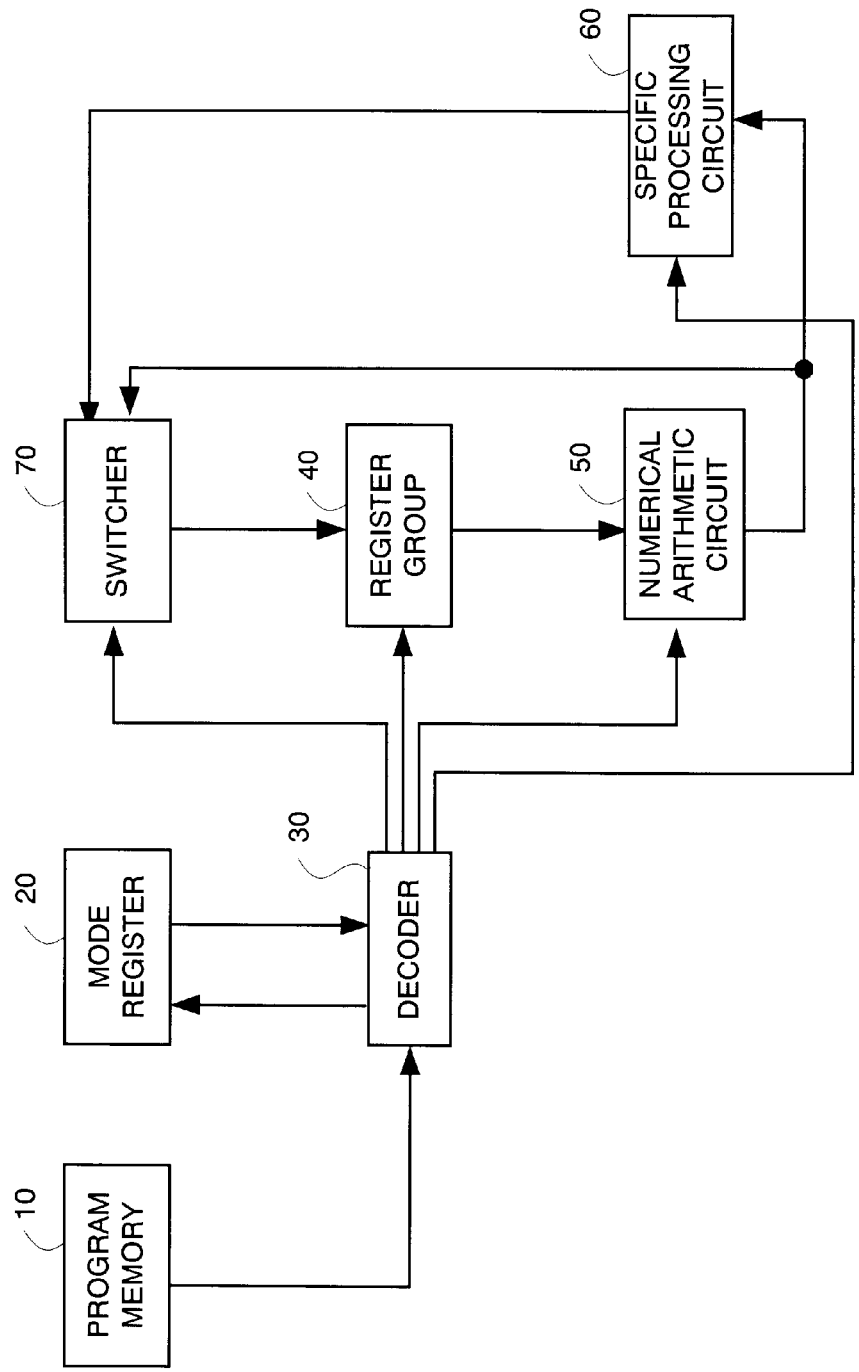
FIG. 1 is a block diagram illustrating the configuration of an arithmetic processing device according to a first embodiment of the present invention.

FIG. 1 shows the configuration of an arithmetic processing device according to the first embodiment of the present invention.

The arithmetic processing device executes instructions according to a program describing a series of process procedures and then selectively performs predetermined arithmetic and logic operations to arithmetic results being the instruction execution results. The arithmetic processing device has a register group for storing arithmetic results. Before the register group stores an arithmetic result, the arithmetic result is selectively subjected to a predetermined arithmetic and logic operation.

Referring to FIG. 1, a program memory 10 stores a program describing a series of process procedures for an arithmetic and logic operation. A mode register 20, being the characterizing element of the present invention, is formed of plural bits corresponding to the register group 40 storing arithmetic results of a numerical arithmetic circuit 50 (to be described later). A flag of designating whether a special process (a predetermined arithmetic and logic operation to be described later) is set to the arithmetic result to be stored in the register group 40.

A decoder 30 controls the operation of each portion according to the program. The decoder 30 decodes an instruction sequentially read out of the program memory 10 and a flag set to the mode register 20 and then outputs various control signals and data signals to various portions. A register group 40 that temporarily stores numerical data is formed of plural registers. The register group 40 stores arithmetic results of the numerical arithmetic circuit 50 and input data. According to the instruction describing a program stored in the program memory, the numerical arithmetic circuit 50 executes a numerical arithmetic and logic operation to numerical data set as input data to the register group.

A specific processing circuit 60 performs a specific process such as rounding and saturation to the arithmetic result of the numerical arithmetic circuit 50 when the register group 40 stores the arithmetic result of the numerical arithmetic circuit 50. An input switcher 70 selects an arithmetic result of the numerical arithmetic circuit 50 or the specific processing circuit 60 to output it to the register group 40.

Figure 2:
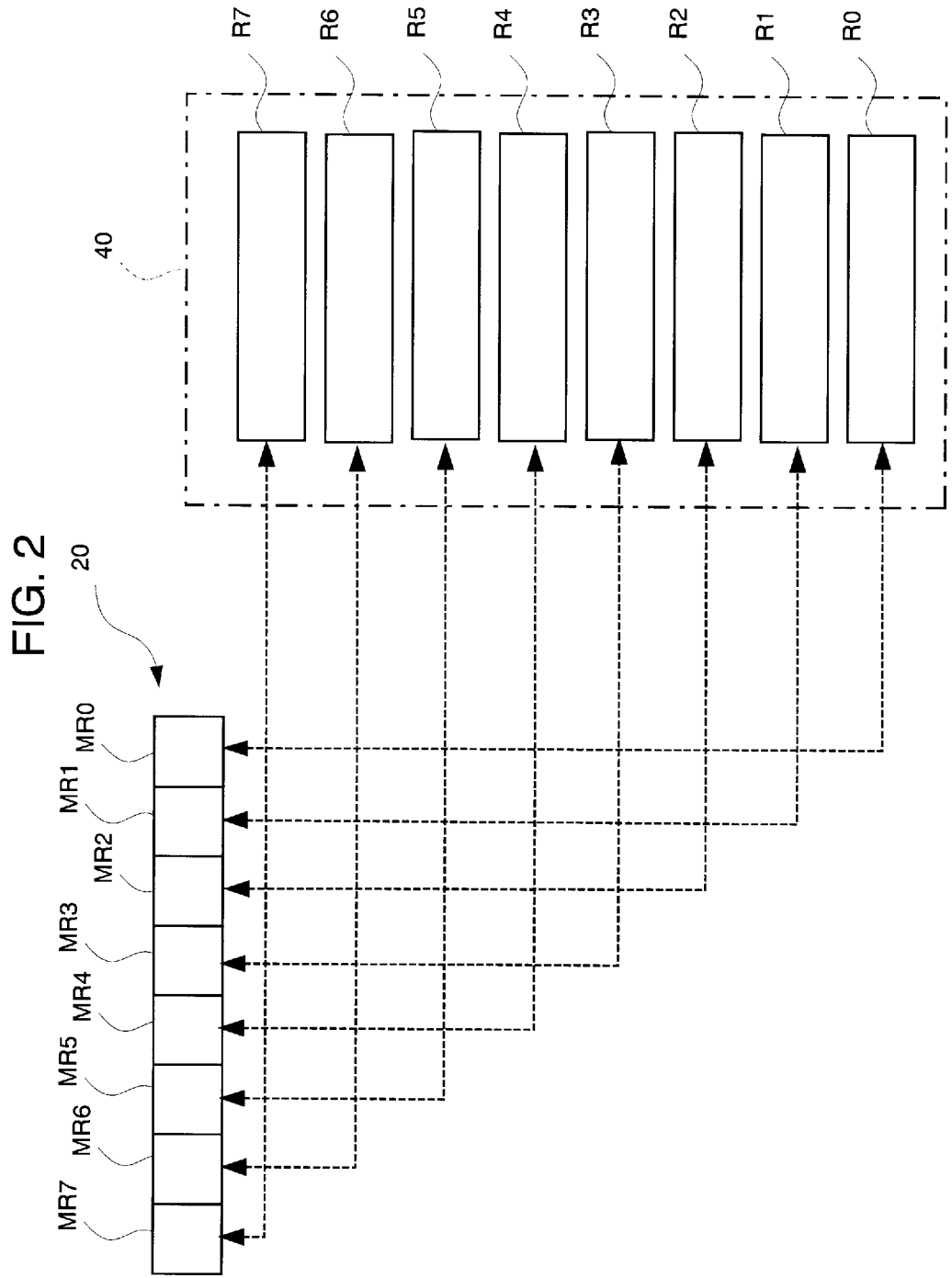
FIG. 2 is a diagram illustrating the relationship between the mode register and the register group within the arithmetic processing device according to the first embodiment of the present invention.

Referring to FIG. 2, the register group 40 is formed of eight registers R0 to R7. The register group 40 can store data of 40 bit length to be processed by the numerical arithmetic circuit 50. The mode register 20 is formed of bits MR0 to MR7 corresponding to the registers R0 to R7 of the register group 40. The mode register 20 sets a flag to designate whether to perform the special process to the arithmetic result stored to the register group 40. For example, the bit MR0 of the mode register 20 stores the flag designating whether to perform a special process to the arithmetic result to be stored in the register group 40.

Figures 3A, 3B:
FIGS. 3A, B are diagrams illustrating a program applied to the arithmetic processing device according to the first embodiment of the present invention.

In the example shown in FIG. 3(a), a series of process procedures to execute an arithmetic operation are described on the program stored in the program memory 10. In this example, a flag setting instruction for setting a flag to the mode register 20 is described on the first line of the program. An arithmetic instruction is described on and after the second line of the program. For example, the arithmetic instruction representing the steps of multiplying the numerical data of the register R0 in the register group 40 by the numerical data of the register R1 therein and then storing the arithmetic result in the register R3 is described on the second line of the program. The arithmetic result of the arithmetic instruction is saturated. The programmer previously estimates saturation of the arithmetic result at the programming step. The arithmetic result is an object for the special process, to be described later.

Regarding the operation of the arithmetic processing device according to the first embodiment, the execution of the program shown in FIG. 3(a) will be described according to the flow shown in FIG. 4.

In the step S10, the decoder 30 sets bits MR0 to MR7 configuring to the mode register 20 to flags according to a flag setting instruction read out of the program memory 10. Specifically, the mode register 20 is set according to the flag setting instruction "mode_reg=0x802A" described on the first line of the program shown in FIG. 3(a).

In the flag setting statement, "0x802A" represents "1000000000101010" in binary notation. Each bit of the lower eight bits "00101010" represents each flag set to bits MR0 to MR7. In this example, the flag "0" is set to bits MR0, MR2, MR4, MR6, and MR7. The flag "1" is set to bits MR1, MR3, and MR5.

In this embodiment, it is assumed that the flag "1" designates a special process. The flag "1" is referred to "enabling flag".

In the step S11, an arithmetic instruction is read out of the program memory 10. Then, the numerical arithmetic circuit 50 performs a numerical arithmetic and logic operation according to the instruction. Specifically, the arithmetic instruction described on the second line of the program shown in FIG. 2 is read out and executed. The arithmetic operation is performed to multiply the numerical data stored in the register R0 by the numerical data stored in the register R1. The arithmetic result becomes the arithmetic result A of the numerical arithmetic circuit 50.

In the step S12, the program designates to store the arithmetic result A, or a multiplication result of the numerical data of the register R0 and the numerical data of the register R1, into the register R3 of the register group 40. However, when the multiplication result is stored in the register group 40, reference is made to the flag set to the bit MR3 of the mode register 20 corresponding to the register R3 being a destination to be stored. Thus, whether or not the flag is the enabling flag "1" is decided.

In the step S13, since the enabling flag "1" is set to the bit MR3 (YES in step S12), the numerical arithmetic circuit 60 performs a special process to the arithmetic result A of the numerical arithmetic circuit 50. Specifically, a saturation process is performed to the multiplication result (the arithmetic result A of the numerical arithmetic circuit 50) of the registers R0 and R1. The arithmetic result A is corrected to the numerical data, not exceeding a predetermined value, so that the arithmetic result B is obtained.

In the step S14, the arithmetic result B obtained in the special process is stored to the register R3 of the register group 40 specified by the program, through the input switcher 70. The decoder 30 controls input switcher 70 to provide the arithmetic result to the register group 40. That is, the decoder 30 determines the switching mode of the input switcher 70 based on the enabling flag set to the mode register 20 and information (target storage information) regarding the register designated as a destination to which the arithmetic result described on the program is stored. Thus, the decoder 30 provides the arithmetic result A of the numerical arithmetic circuit 50 or the arithmetic result B of the special process circuit 60 to a register in the register group 40 (to a register designated on the program).

FIG. 3(b) illustrates a statement defining the operation of the decoder 30. In this example, whether the enabling flag "1" is set to the mode register "mode_reg [REG]" specified by target storage information REG is determined by the conditional statement "if". When the condition is satisfied, "saturate" representing a saturation process is set to a predetermined register "resister". When "resister" is set, the specific processing circuit 60 executes the saturation process. The statement shown in FIG. 3(b) is described in the program together with the arithmetic statement shown in FIG. 3(a).

The enabling flag "1" is not set to the bit MR3 corresponding to the register R3 to be stored (NO in step S12), the step S13 is not executed. The arithmetic result A of the numeral arithmetic circuit 50 is stored to a register in the register group 40 specified on the program.

The arithmetic instruction described on the second line of the program shown in FIG. 3 is executed. In a similar manner, instructions on and after the third line are sequentially executed by referring to the flag of the mode register 20 corresponding to a destination to be stored. In this example, the specific processing circuit 60 performs a specific process of the arithmetic result A of the numeral arithmetic circuit 50 executed according to the arithmetic instructions described on the second, fourth and sixth lines of the program. Then, the arithmetic result B is stored in the registers R3, R1 and R5. The arithmetic results A of the numeral arithmetic circuit 50 executed according to the arithmetic instructions described on the third, fifth and seventh lines of the program are stored to the registers R2, R0 and R4 in the register group 40, without any change.

In the program example, an arithmetic instruction which requires a special process and an arithmetic instruction which does not require a special process are alternately executed to the arithmetic result A of the numerical arithmetic circuit 50. However, there are no changes in the content of the mode register 20 which sets a flag designating whether or not a special process is performed. That is, in this embodiment, the presence or absence of the special process to the arithmetic result A is controlled without rewriting the mode resistor 20. The reason is that whether or not the special process is executed to the arithmetic result A is determined by selecting a register in the register group 40 as an arithmetic-result storage destination. When a register to be stored is merely selected on the program, whether or not a special process is performed to the arithmetic result A is arbitrarily controlled.

How to set the flag of the register 20 is determined according to the process content of the program. FIG. 3(a)

represents three lines on which instructions requiring a saturation process to arithmetic results are described and three lines on which a process not requiring any saturation process to arithmetic results is described. That is, when the program is executed, a half of the arithmetic results require the saturation process. In this case, a half of registers in the register group 40 which stores arithmetic results are allocated to store arithmetic results to which the arithmetic process is performed. The enabling flag "1" is set to a half of mode registers 20 corresponding to a half of the register group 40. The use efficiency of the register-group 40 can be improved according to the process content so that the register group 40 stores the arithmetic result A and the arithmetic result B effectively.

Figure 5:
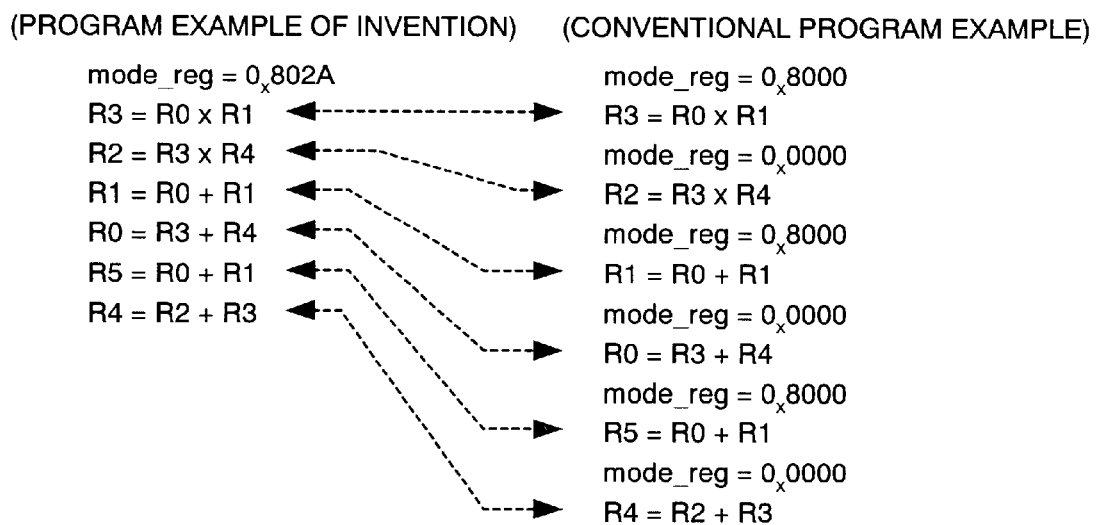
FIG. 5 is diagram comparing a program applied to an arithmetic processing device according to the first embodiment of the present invention with a program applied to a conventional-art device.

FIG. 5 illustrates the comparison between a program of the first embodiment and a prior-art program for a similar arithmetic process. The program in the first embodiment contains the statement of setting the mode register 20 on the leading line only. However, since the mode register has to be reset every time the request for a specific process is varied, the prior-art program requires the statement of resetting the mode register every time the request for a specific process is varied. Accordingly, when the arithmetic process in which the presence or absence of the specific process is alternately changed is executed, the number of lines of the program in the first embodiment is roughly halved in comparison with the prior-art technique.

According to the first embodiment, the specific processing circuit 60 selectively processes the arithmetic result A of the numeral arithmetic circuit 50 according to the flag set to the mode register 20. Hence, the specific process is executed in the necessary case only so that the execution is minimized in necessity.

(Second Embodiment)

Figure 6:
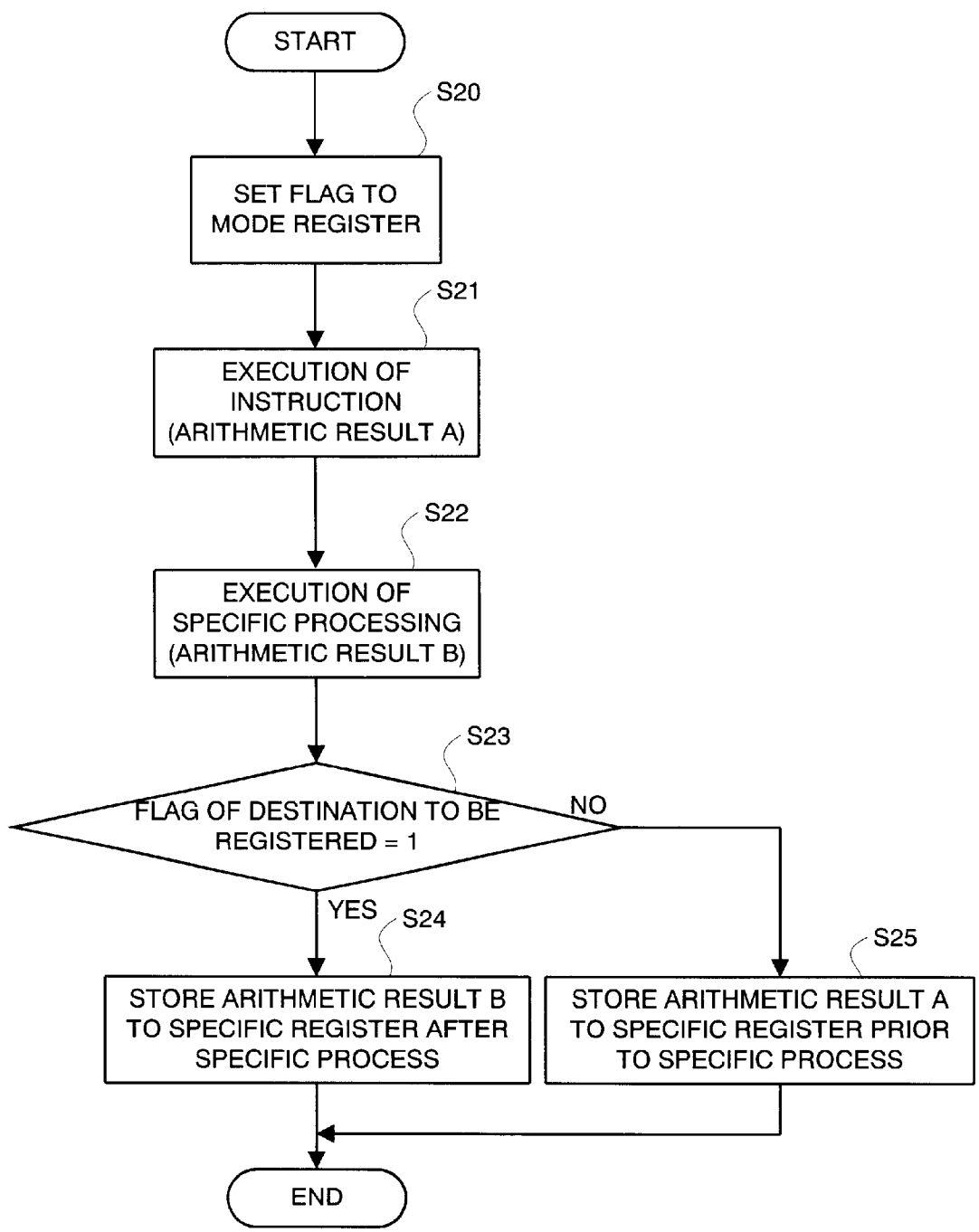
FIG. 6 is a flow chart illustrating the operational flow of an arithmetic processing device according to the second embodiment of the present invention.

The second embodiment of the present invention will be explained below with reference to FIG. 6.

In the first embodiment, the specific processing circuit 60 selectively performs the specific process according to the flag set to the mode register 20. However, the second embodiment is characterized in that the specific processing circuit 60 uniformly performs the specific process to the arithmetic result A of the numerical arithmetic circuit 50 and then selectively outputs either the arithmetic result A of the numerical arithmetic circuit 50 and the arithmetic result B of the specific processing circuit 60 to the register group 40. The configuration of the arithmetic device is similar to that in the first embodiment of FIG. 1.

The case where the device in the second embodiment executes the program shown in FIG. 3 will be explained below according to the flow of FIG. 6.

In the steps S20 to S21, respective flags are set to the mode register 20 under control of the decoder 30 according to the flag setting instruction first read out of the program memory 10, in a manner similar to the steps S10 and S11 in the first embodiment. Thereafter, the arithmetic instruction on the second line is read out and the numerical arithmetic circuit 50 performs a numerical arithmetic operation. In this example, the numerical data stored in the register R0 and the number data stored in the register R1 are read out for the multiplication operation. Thus, the register R3 is designated as a destination in which the arithmetic result A is stored.

In the step S2, the specific processing circuit 60 uniformly subjects the arithmetic result A of the numerical arithmetic circuit 50 to a specific process.

In the step S23, the flag set to the bit MR3 of the mode register 20 corresponding to the register R3 designated as the destination for storage of the arithmetic result A on the second line of the program is referred to. Thus, whether or not the flag corresponding to the storage destination is the enabling flag "1" is decided.

In the step 24, since the enabling flag "1" is set to the bit MR3 (YES in step S23), the input switcher 70 selects the arithmetic result B of the specific processing circuit 60 and then outputs it to the specific register R3 of the register group 40.

In the step S25, when it is judged that the enabling flag is not set in the step S23 (NO in step 523), the input switcher 70 selects the arithmetic result before the specific process, that is, the arithmetic result A of the numerical arithmetic circuit 50. Thus, the switcher 70 outputs it to a specified register in the register group 40.

As described above, the arithmetic instruction described on the second line of the program shown in FIG. 2 is executed. Similarly, arithmetic instructions described on and after the third line are sequentially executed.

According to the second embodiment, the specific processing circuit 60 uniformly executes a specific process of the arithmetic result A, independently of the flag set to the mode register 20. Then, the arithmetic result A of the numerical arithmetic circuit 50 or the arithmetic result B of the specific processing circuit 50 is selected according to the flag set to the mode register 20. Accordingly, the mode register 40 can refer to the flag while the specific process is being performed. As a result, the arithmetic operation can be performed at high speed.

(Third Embodiment)

The third embodiment of the present invention will be described below with reference to FIG. 7.

Instead of the mode register 20 in the configuration of the arithmetic processing device according to the first embodiment shown in FIG. 1, the arithmetic processing device according to the third embodiment includes the mode register 20A. The mode register 20A includes the bit $R_{ENA}$ setting the control flag that validates or invalidates the flag designating execution or non-execution of a specific process. In other words, the mode register 20A is configured so as to add the bit $R_{ENA}$ to the mode register 20 (bits MR0 to MR7).

The operation of the third embodiment will be described by referring to the flow of FIG. 4.

Figure 4:
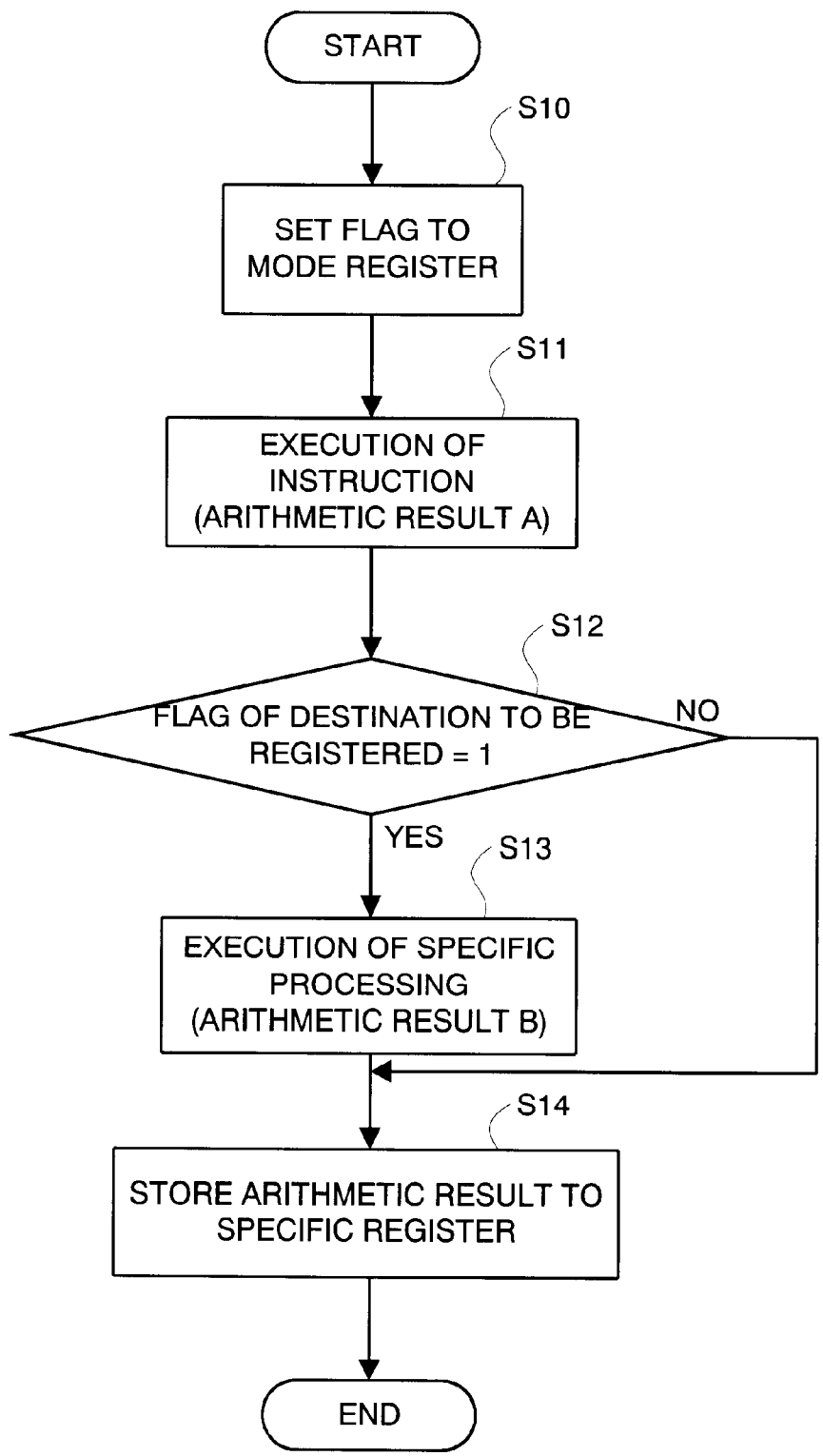
FIG. 4 is a flow chart illustrating the operational flow of the arithmetic processing device according to the first embodiment of the present invention.

In the third embodiment, since the contents in the steps S10 and S12 of FIG. 4 have to be partially changed, the reference numbers in explanation are changed from the step S10 to the step S10A and from the step S12 to the step S12A.

In step S10A, flags are set to the bits MR0 to MR7 of the mode register 20A corresponding to bits in the register group 40 being bits corresponding to the register group 40, in a manner similar to that in the step S10 of the above first embodiment. Moreover, the control flag that determines validation or invalidation of flags set to the bit MR0 to MR7 is set to the control bit $R_{ENA}$. In the third embodiment, when "1" is set as the control flag to the control bit $R_{ENA}$, the flags set to bits MR0 to MR7 are regarded as valid ones.

In the step S11, the numerical arithmetic circuit 50 obtains the arithmetic result A by executing an arithmetic instruction.

In the step S12A, it is judged whether or not the control flag is "1" by referring to the control flag set to the control bit $R_{ENA}$, in advance of the flags set to the bits MR0 to MR7 corresponding to the register group 40. That is, in order to validate the flags set to the bits MR0 to MR7, whether or not the content of the control flag set to the control bit $R_{ENA}$ is affirmative is decided.

When the control flag is "1", a process similar to the process in each of the steps S12 to S14 of the first embodiment is executed. That is, a specific process is controlled by referring to flags set to the bits MR0 to MR7 corresponding to the register 40. Thus, the arithmetic result A or the arithmetic result B is stored in a specific register in the register group 40. When the control flag is "0", the flags set to the bit MR0 to MR7 are ignored so that the specific processing circuit 60 does not execute any specific process. Accordingly, the arithmetic result A of the numeral arithmetic circuit 50 is stored in a specific register in the register group.

The decoder 30 controls execution of a series of steps. That is, when referring to the mode register 20, the decoder 30 refers to the control bit $R_{ENA}$ in advance of the bits MR0 to MR7. Only when the control flag set to the control bit $R_{ENA}$ is "1" (an enabling flag) and affirmative, the decoder 30 refers to the flags set to the bits MR0 to MR7. Thus, the specific process of the specific processing circuit 60 and the changeover status of the input switcher 70 are controlled according to the flags. Meanwhile, the arithmetic result A of the numerical arithmetic circuit 50 or the arithmetic result B of the specific processing circuit 60 is stored into the designated register in the register group 40. When the control flag is "0", the flags set to the bits MR0 to MR7 of the mode register 20 are ignored. The arithmetic result A of the numerical arithmetic circuit 50 is stored to a designated register in the register group 40 via the input switcher 70.

According to the third embodiment, only the control flag $R_{ENA}$ is rewritten. Thus, whether or not a specific process is performed to the arithmetic result A based on the flag set to the mode register 20 is controlled, without rewriting the content of the bits MR0 to MR7 corresponding to the mode register group 40. For instance, when the flow jumps to another routine by interruption or call, during the execution of a program, the hardware rewrites the control flag $R_{ENA}$ so that the setting at the execution of the original program is invalidated. Accordingly, it can be avoided that the setting condition at the execution of the original program is applied to a destination to be jumped, with no intention, so that the process at the jumped destination can be maintained. Moreover, when the flow returns to the original program, the control flag only is reset to the original value. Thus, the setting at the execution of the original program is validated again.

In the third embodiment, rewriting one flag $R_{ENA}$ allows non-execution of a specific process to be controlled. Hence, whether or not the specific process is performed can be controlled, without rewriting the bits MR0 to MR7 in the mode register 20.

(Fourth Embodiment)

The fourth embodiment of the present invention will be explained below with reference to FIG. 8.

The fourth embodiment uses the mode register 20B, instead of the mode register 20A in the third embodiment. The mode register 20B contains plural control bits $R_{ENA1}$ and $R_{ENA2}$ setting the control flag which determines whether or not flags set to the bits MR0 to MR7 corresponding to the register group 40 and associated with the process content in the arithmetic processing section is validated or invalidated.

The fourth embodiment can control the execution of each step even when plural arithmetic and logic processes, e.g. saturation or rounding, exist as a specific process (predetermined arithmetic process) of the arithmetic processing circuit 60, in addition to the effect of the third embodiment. For example, the control bit $R_{ENA1}$ is associated with a saturation process and "1" is set as a control flag to the control bit $R_{ENA1}$. The control bit $R_{ENA2}$ is associated with a rounding process and "0" is set as a control flag to the control bit $R_{ENA2}$. In the saturation process, the flags set to the bits MR0 to MR7 of the mode register 20 are referred to. In the rounding process, the flags set to the bits MR0 to MR7 are ignored. Hence, it is controlled whether or not the flags set to the bit MR0 to MR7 is validated according to the content of the specific process. Thus, this makes it possible to control a specific one among plural arithmetic processes.

The present invention has been explained with reference to the first to fourth embodiments. However, the present invention is not limited to only the embodiments. The present invention covers changes in design without departing from the scope of the present invention. For instance, in the above embodiments, the bits MR0 to MR1 of the mode register are respectively provided corresponding to the registers R0 to R7 in the register group 40. Without being restricted to the above embodiments, one bit configuring the mode register 20 may correspond to plural registers forming the register group 40. The relationship between them may be set suitably.

In the third embodiment, it is assumed that the control bit $R_{ENA}$ and the bits MR0 to MR7 of the mode register 20 are judged in the step S12A. However, the present invention is not limited to only this embodiment. The judging process may be separated into different steps to such an extent that the control bit $R_{ENA}$ is preferentially judged compared with the bits MR0 to MR7.

As described above, the arithmetic processing device according to the present invention contains the second register that sets the flag designating execution or non-execution of a predetermined arithmetic process to the instruction execution result to be stored in a register in the first register group designated on the program. The second register is prepared corresponding to the first register group for storing instruction execution results executed according to the program on which a series of process procedures are described. Hence, it is not required to vary the flag designating execution or non-execution of a predetermined arithmetic result, on the program every operation. Hence, an increase in scale of the program describing a process procedure for a series of numerical arithmetic operations can be suppressed even when a predetermined process are intermittently repeated to an instruction execution result.

Moreover, according to the present invention, the arithmetic processing device comprises a program storage section for storing a program describing a series of procedures; an instruction execution section for executing instructions described in the program; a first register group for storing an instruction execution result; an arithmetic processing section for performing a predetermined arithmetic and logic operation of the instruction execution result; a second register arranged corresponding to the first register, for setting whether or not the predetermined arithmetic and logic operation is performed to the instruction execution result; and a control section referring to a flag set to the second registers corresponding to plural registers in the first register group when the instruction execution result is stored in the first register group, each second register being designated as a register to which the instruction execution result is stored. For that reason, it is not required to vary the flag designating execution or non-execution of a predetermined arithmetic result, on the program every operation. Hence, an increase in scale of the program describing a process procedure for a series of numerical arithmetic operations can be suppressed even when a predetermined process is intermittently repeated to an instruction execution result.

Further, in the arithmetic processing device of the present invention, the control section controls the arithmetic processing section to selectively perform the predetermined arithmetic and logic operation of the instruction execution result of the instruction execution section of the instruction execution section, according to the flag. Hence, a predetermined arithmetic process is controlled according to the flag so that the frequency of the operation of the arithmetic processing section is minimized.

Furthermore, according to the present invention, the control section controls the arithmetic processing unit to uniformly perform the predetermined arithmetic and logic operation of an instruction execution result of the instruction execution section. Thus the control section selects either an instruction execution result of the instruction execution section or an arithmetic result of the arithmetic processing section according to the flag and then stores the selected result into the first register group. Accordingly, a flag can be referred to during a predetermined process so that the arithmetic process can be performed at high speed.

Moreover, according to the present invention, the second register has a bit for setting a control flag determining whether or not flags set to bits corresponding to the first register group are validated. Accordingly, whether or not a predetermined arithmetic process is performed can be controlled without rewriting the second register corresponding to the first register group.

Moreover, in the arithmetic processing device according to the present invention, the second register has a plurality of bits for setting control flags. The control bit determines whether or not flags set to bits corresponding to the first register group are validated corresponding to the process content of the arithmetic processing section. Accordingly, whether or not any one of plural arithmetic processes of the arithmetic processing section is performed to an instruction execution result can be controlled for each arithmetic process.

According to the present invention, the arithmetic processing method comprises (a) a first step of setting a flag to a second register corresponding to a register included in the plural first register group designated on the program, the second register acting as a register storing the instruction execution result; (b) a second step of executing an instruction described on the program; (c) a third step of controlling the predetermined arithmetic and logic operation to the instruction execution result, by referring to a flag set to the second register when the first register group stores the instruction execution result; and (d) a fourth step of storing an instruction execution result subjected to the predetermined arithmetic and logic operation into the first register group. Hence, it is not required to vary the flag designating execution or non-execution of a predetermined arithmetic result, on the program every operation. Accordingly, an increase in scale of the program describing a process procedure for a series of numerical arithmetic operations can be suppressed even when a predetermined process is intermittently repeated to an instruction execution result.

In the arithmetic processing method of the present invention, the third step comprises selectively performing the predetermined arithmetic and logic operation of the instruction execution result of the instruction execution section, according to the flag. Thus, the execution of a predetermined arithmetic process is controlled according to the flag. Accordingly, the frequency of the predetermined arithmetic process can be minimized.

Moreover, according to the present invention, the third step comprises the steps of uniformly executing the arithmetic and logic operation of the instruction execution result, selecting an instruction execution result of the instruction execution section or an arithmetic result of the predetermined arithmetic processing, according to the flag set to the second register, and thus storing the selected result into the first register group. Accordingly, a flag can be referred to during a predetermined process so that the arithmetic process can be performed at high speed.

The entire disclosure of Japanese Patent Application No. 11-249327 filed on Sep. 2, 1999 including specification, claims, drawing, and summary are incorporated herein by reference in its entirety.

What is claimed is:

1. An arithmetic processing device, said device comprising:

a register group including a plurality of registers, for storing in a register of said register group an instruction execution result resulting from execution of an instruction of a program describing a series of procedures; and a register including a plurality of bits corresponding to said plurality of registers in said register group, for setting a flag into a bit corresponding to said register in said register group that is to store said instruction execution result to specify whether or not a predetermined arithmetic and logic operation is to be selectively applied to said instruction execution result before said instruction execution result is stored in said register included in said register group, as specified in said program.

2. The arithmetic processing device defined in claim 1, wherein said register includes:

a control bit for setting a control flag determining whether or not flags set by said plurality of bits are validated.

3. The arithmetic processing device defined in claim 1, wherein said register includes:

a plurality of control bits for setting a plurality of control flags corresponding to the content of said predetermined arithmetic and logic operation, said plurality of control bits determining whether or not flags set by said plurality of bits are validated.

4. An arithmetic processing device, wherein an instruction is executed according to a program which describes a series of procedures and a predetermined arithmetic and logic operation is selectively applied to an instruction execution result resulting from execution of said instruction, said device comprising:

a program storage section for storing said program;

an instruction execution section for executing said instruction described in said program;

a register group including a plurality of resters, for storing in a register of said resister group said instruction execution result from said instruction execution section;

an arithmetic processing section for applying said predetermined arithmetic and logic operation to said instruction execution result;

a register including a plurality of bits corresponding to said plurality of registers in said register group, for setting a flag into a bit corresponding to said register in said register group that is to store said instruction execution result to specify whether or not said predetermined arithmetic and logic operation is, to be selectively applied to said instruction execution result before said instruction execution result is stored in said register included in said register group; and a control section for controlling the selective application of said arithmetic and logic operation to said instruction execution result, by referring to said flag set to said bit of said register corresponding to said resister in said register group as designated en in said program before said instruction execution result is stored to said register in said register group.

5. The arithmetic processing device defined in claim 4, wherein said control section controls said arithmetic processing section to selectively execute said predetermined arithmetic and logic operation of said instruction execution result of said instruction execution section according to said flag.

6. The arithmetic processing device defined in claim 4, wherein said control section controls said arithmetic processing unit to uniformly execute said arithmetic and logic operation of an instruction execution result of said instruction execution section, selecting said instruction execution result of said instruction execution section or an arithmetic result of said arithmetic processing section according to said flag, and thus storing the selected result into said register of said register group.

7. An arithmetic processing method, wherein an instruction is executed according to a program on which a series of procedures are described and a predetermined arithmetic and logic operation is selectively applied to an instruction execution result resulting from execution of said instruction, thus storing the arithmetic result, said arithmetic processing method comprising:

(a) setting a flag into a bit of a register, said register including a plurality of bits corresponding to a plurality of resisters in a register group, said bit corresponding to a register included in said register group designated in said program, said register in said register group acting as a register for storing said instruction execution result;

(b) executing said instruction described in said program;

(c) controlling said selective application of said predetermined arithmetic and logic operation to said instruction execution result, by referring to a said flag set to said bit of said register when said instruction execution result is stored in said register of said register group; and (d) storing said instruction execution result subjected to said predetermined arithmetic and logic operation into said register of said register group.

8. The arithmetic processing method defined in claim 7, wherein said controlling step (c) comprises the step of selectively executing said predetermined arithmetic and logic operation of said instruction execution result according to said flag.

9. The arithmetic processing method defined in claim 7, wherein said controlling step (c) comprises the steps of:

uniformly executing said arithmetic and logic operation of said instruction execution result; and selecting said instruction execution result or an arithmetic result resulting from said, selective application of said predetermined arithmetic and logic operation to said instruction execution result according to a flag set to said second register; and storing the selected result into said resister of said register group.

10. The arithmetic processing method defined in claim 7, wherein said setting step (a) comprises the steps of setting said flag to said bit of said register and setting a control bit of said register, said control bit determining whether or not said flag is validated; and said controlling step (c) comprises the steps of referring to said control bit of said register, in advance of a said flag set to said bit of said register, and referring to said flag set in said bit of said resister when the content of said control bit is affirmative, and then controlling said predetermined arithmetic and logic operation.

\* \* \* \* \*